Feb. 24, 1948.          R. E. BIRDSALL          2,436,374
COMBINED HATCH COVER LOCK AND HEADREST
Filed May 15, 1945
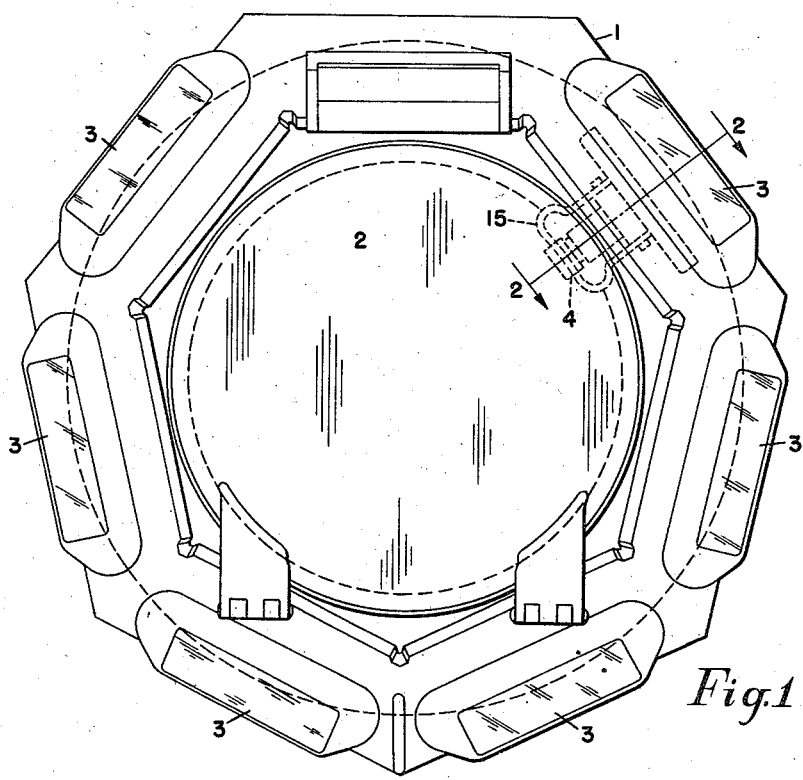
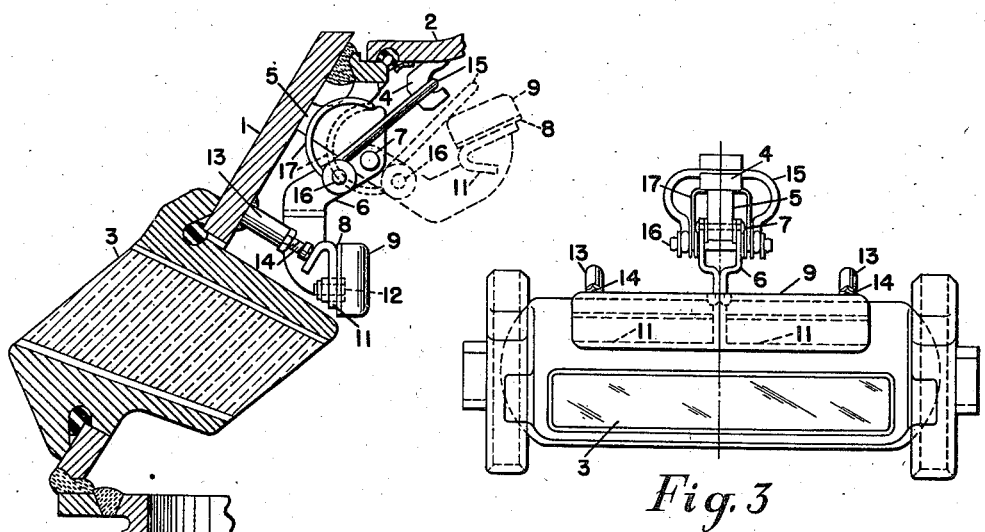
Fig.1
Fig.2
Fig.3
Inventor
ROBERT E. BIRDSALL
Attorneys Patented Feb. 24, 1948

2,436,374

UNITED STATES PATENT OFFICE 2,436,374

COMBINED HATCH COVER LOCK AND HEADREST

Robert E. Birdsall, Detroit, Mich.

Application May 15, 1945, Serial No. 593,916

6 Claims. (Cl. 296—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to locking members, and it is, more particularly, related to a combined locking member and head rest member for use in an armored vehicle.

In the ordinary hatch structure of a tank or other armored vehicle, a minimum of space is provided for locking members for the hatch cover and for head rests adjacent the viewing windows in the hatch structure. Locking members heretofore provided were not quickly and automatically operable and extended into the central portion of the hatch structure, thereby decreasing the area in which a person had to move within the hatch structure. Head rests have also required considerable space provided them adjacent the viewing windows. No previous device has been provided for adjusting the head rest.

It is, accordingly, an object of my invention to overcome the above and other defects in locking means for hatch covers and in head rests for viewing windows in a hatch structure, and it is, more particularly, an object of my invention to provide a combined locking member for a hatch cover and a head rest for disposal adjacent a viewing window in a hatch structure which is simple in construction, economical in cost, efficient in operation, requires a minimum of space and is automatic in operation.

Another object of my invention is to provide a quickly attachable and releasable locking member for a hatch cover and a head rest adjacent a viewing window in a hatch structure which is disposed in a minimum of space adjacent to the inner wall of a hatch structure and without obstructing the hatchway.

Another object of my invention is to provide adjusting means for the head rest adjacent a viewing window in a hatch structure of a combat vehicle.

Other objects of my invention will become evident from the following detailed description, taken in conjunction with the accompanying drawings, in which:

Figure 1 is a plan view of a hatch structure with the hatch cover shown closed and with viewing windows thereround;

Figure 2 is a fragmentary sectional view taken on the line 2—2 of Figure 1, and

Figure 3 is a side elevational view taken from the center of the hatch structure.

Referring now to the drawings, Figures 1, 2 and 3 show a hatch structure 1 with a hatch cover 2 and viewing windows 3 around the periphery thereof. The hatch cover 2 has a depending hook member 4 extending at substantially a 45° angle from said hatch cover 2. A support 5 attached to the side of the hatch structure 1 by welding or any other suitable means supports lever arm 6 pivotally by means of pivot pin 7. Lever arm 6 is angular in shape and has an offset portion 8 to which is attached a relatively soft material, such as, rubber, or the like, to form a head rest 9 adjacent the viewing window 3. An abutting member 11 is attached to the back of the head rest 9 by a bolt member 12. An adjusting member 13 with a threaded head screw 14 threadably disposed therein abuts against the abutting member 11 to stop the head rest 9 at any predetermined position within predetermined limits. A loop or spring member 15 is pivotally attached to an intermediate portion of the lever arm 6 by a pin 16 as shown in Figure 2. The lever 6 when forced towards the side of the hatch structure 1 and against the abutting member 13 and head screw 14 throws the spring member 15 attached to depending hook 4 beyond a dead center point and thereby locks the hatch cover 2 in a closed position. The spring member 15 maintains a tension on the hatch cover 2 to maintain it in a securely closed position. The head rest 9 is then disposed adjacent a viewing window 3 wherein the forehead of an observer may rest against the head rest while peering through the viewing window 3. A head rest is absolutely necessary in a combat vehicle passing over rough terrain because of the swaying and pitching of the machine. When the lever arm 6 is pulled to a position where it rotates counter-clockwise from a position shown in Figure 2, it automatically assumes a position as shown in the dotted lines in Figure 2 when it passes dead center in a counter-clockwise direction. It will be seen that when my novel locking means is in a closed position as shown in Figure 2, all parts are closely adjacent to the wall of the hatch structure 1, and the head rest 9 tends to provide a safety feature to prevent accidents from any person bumping against the hatch cover lock instead of the hatch structure. A spring 17 carried by the lever arm 6 and secured thereto by the pin 16 holds the lever 6 in a locked position and also in the open position shown in Figure 2 by dotted lines.

From the foregoing, it will be seen that I have provided a novel combined hatch cover locking means and head rest adjacent a viewing aperture in a hatch structure which is simple in construction, consumes a minimum of space, is efficient in operation, economical in cost and which is adjustable.

Various changes may be made in the specific embodiment of my invention without departing from the spirit thereof, or from the scope of the appended claims.

What I claim is:

1. In combination with a hatch structure having a viewing window therein and a hatch cover with a depending locking projection therefor, a combined cover locking means and head rest comprising a support on said hatch structure, a lever arm having an offset portion pivotally mounted on said support, a head rest member attached to said offset portion of said lever arm, a locking spring member pivoted on an intermediate portion of said lever arm engageable with said locking projection, said lever arm being pivotally movable in one direction to a locking position beyond dead center relative to said locking projection when said cover is in a closed position, and adjustable means carried by said structure and cooperatively limiting the pivotal movement in said one direction of said lever arm when the latter is in said locking position, said locking spring member engaging said locking projection of said hatch cover to lock the latter in closed position when said lever arm is in said locking position, said head rest being immediately adjacent said viewing window when said lever arm is in said locking position.

2. A combined cover locking means and head rest as set forth in claim 1, including resilient means for urging said lever arm to said locking position, said resilient means comprising a spring carried by said lever arm, said spring urging said lever arm to said locking position coincident with the pivotal movement of said lever arm in said one direction, said spring being tensioned coincident with the pivotal movement of said lever arm in the other direction.

3. In a combined hatch cover lock and head rest for armored vehicles having an observation cupola provided with a hatch opening, a cover therefor having a dependent hook member for closing said hatch opening, and a viewing window therein below and adjacent said hatch opening, the combination of a pivotally rotatable offset lever arm pivotally secured at one end to the inside of said cupola and positioned between the said hatch opening and the said viewing window, said lever arm being pivotally rotatable in one direction to a locking position wherein the other end of said lever arm is adjacent said viewing window, adjustable means limiting the pivotal rotation in said one direction of said lever arm when the latter is in said locking position, a resilient engaging member pivoted on the intermediate portion of said pivot arm, said resilient engaging member engaging said dependent hook member to close said cover when the said lever arm is pivotally rotated in said one direction toward said locking position, and a head rest member attached to the other end of said lever arm, said head rest member being immediately adjacent the viewing window when the lever arm is at the limit of its pivotal rotation in said one direction in said locking position whereby the head rest is in position for use by an observer within the locked cupola while observing through the viewing window.

4. In combination with an observation cupola having a hatch opening, a cover therefor provided with a depending inner locking projection, and a viewing window therein adjacent said hatch opening, a combined hatch cover lock and head rest comprising a lever arm having an offset portion pivotally secured to the inside wall of said cupola below said hatch opening, a head rest member attached to the offset portion of said lever arm and a locking spring member pivoted intermediate said lever arm engageable with said locking projection on said hatch cover, said lever arm being pivotally rotatable in one direction to a locking position beyond a dead center relative to said locking projection, said locking spring member engaging said locking projection of said cover to lock the latter in closed position when said lever arm is in said locking position, said head rest being immediately adjacent said viewing window when said lever arm is in said locking position.

5. The structure of claim 4, wherein adjustable means are provided for limiting the pivotal rotation in said one direction of said lever arm, the said means comprising an adjustable stop member secured to the cupola and an abutment member carried by the head rest member.

6. The structure of claim 4 wherein the head rest comprises a member formed of a relatively soft material secured to said offset portion of said lever arm and positioned so that it will be brought immediately adjacent said viewing window when the lever arm is in locking position and arranged to cooperate with the said lever arm in retaining the said spring member in engagement with the said locking projection when pressed against while being used as a head rest.

ROBERT E. BIRDSALL.

REFERENCES CITED

The following references are of record in the file of this patent:

UNITED STATES PATENTS

| Number | Name | Date |
| --- | --- | --- |
| 783,338 | Ward | Feb. 21, 1905 |
| 1,331,874 | Priest | Feb. 24, 1920 |
| 1,350,713 | Ferdon | Aug. 24, 1920 |
| 1,371,422 | Isidor | Mar. 15, 1921 |
| 1,696,439 | Knox | Dec. 25, 1928 |

FOREIGN PATENTS

| Number | Country | Date |
| --- | --- | --- |
| 481,883 | Great Britain | Mar. 18, 1938 |
| 517,624 | Germany | Feb. 6, 1931 |